United States Patent
Fischman

(10) Patent No.: US 10,440,905 B2
(45) Date of Patent: Oct. 15, 2019

(54) SYSTEM AND METHOD FOR IRRIGATION MANAGEMENT USING VRI RAY CASTING ALGORITHMS WITHIN IRRIGATION MACHINE WORKFLOWS

(71) Applicant: Valmont Industries, Inc., Omaha, NE (US)

(72) Inventor: Kevin K. Fischman, Elkhorn, NE (US)

(73) Assignee: Valmont Industries, Inc., Omaha, NE (US)

( * ) Notice: Subject to any disclaimer, the term of this patent is extended or adjusted under 35 U.S.C. 154(b) by 0 days.

(21) Appl. No.: 16/149,224

(22) Filed: Oct. 2, 2018

(65) Prior Publication Data

US 2019/0104696 A1    Apr. 11, 2019

Related U.S. Application Data

(60) Provisional application No. 62/568,542, filed on Oct. 5, 2017.

(51) Int. Cl.
| | | |
|---|---|---|
| *A01G 25/16* | (2006.01) | |
| *A01G 25/09* | (2006.01) | |
| *B05B 15/60* | (2018.01) | |
| *B05B 1/20* | (2006.01) | |

(52) U.S. Cl.
CPC .......... *A01G 25/167* (2013.01); *A01G 25/09* (2013.01); *A01G 25/092* (2013.01); *B05B 1/20* (2013.01); *B05B 15/60* (2018.02)

(58) Field of Classification Search
USPC ....................................................... 700/284
See application file for complete search history.

(56) References Cited

U.S. PATENT DOCUMENTS

| | | | |
|---|---|---|---|
| 4,209,131 A | 6/1980 | Barash et al. | |
| 5,246,164 A | 9/1993 | McCann et al. | |
| 5,740,038 A | 4/1998 | Hergert | |
| 6,290,151 B1 | 9/2001 | Barker et al. | |
| 6,957,782 B2 * | 10/2005 | Clark ..................... | B05B 1/267 239/200 |
| 7,017,831 B2 * | 3/2006 | Santiago ............... | B05B 3/0431 239/200 |
| 7,584,023 B1 | 9/2009 | Palmer et al. | |
| 7,590,471 B2 | 9/2009 | Jacobsen et al. | |
| 7,917,249 B2 | 3/2011 | Jacobsen et al. | |
| 7,953,550 B1 | 5/2011 | Weiting | |
| 8,739,830 B2 | 6/2014 | Bradbury et al. | |
| 2005/0161534 A1 * | 7/2005 | Kah, Jr. .................. | B05B 1/262 239/514 |
| 2007/0267524 A1 | 11/2007 | Mack | |
| 2011/0049260 A1 | 3/2011 | Palmer et al. | |
| 2012/0053776 A1 | 3/2012 | Malsam et al. | |
| 2013/0099022 A9 | 4/2013 | Palmer et al. | |

(Continued)

*Primary Examiner* — Ziaul Karim
(74) *Attorney, Agent, or Firm* — Milligan PC LLO

(57) ABSTRACT

The present invention discloses a system and method for irrigation management using VRI ray casting algorithms within irrigation machine workflows. According to an exemplary preferred embodiment, the present invention may preferably include: a position sensor which determines a position of the irrigation system; a memory system storing a prescribed watering plan for a field; and a variable rate mapping program using VRI ray casting algorithms.

6 Claims, 5 Drawing Sheets

(56) References Cited

U.S. PATENT DOCUMENTS

| | | | |
|---|---|---|---|
| 2013/0218873 A1* | 8/2013 | Lassley | G06F 17/30554 |
| | | | 707/722 |
| 2014/0074734 A1 | 3/2014 | Lassley et al. | |
| 2015/0154809 A1 | 6/2015 | Chen et al. | |
| 2016/0088807 A1* | 3/2016 | Bermudez Rodriguez | ............ |
| | | | A01G 25/092 |
| | | | 700/284 |
| 2016/0219807 A1* | 8/2016 | Kohler | G05B 19/0426 |
| 2018/0054982 A1* | 3/2018 | Whalley | A01G 25/092 |

\* cited by examiner

SYSTEM AND METHOD FOR IRRIGATION MANAGEMENT USING VRI RAY CASTING ALGORITHMS WITHIN IRRIGATION MACHINE WORKFLOWS

RELATED APPLICATIONS

The present application claims priority to U.S. Provisional Application No. 62/568,542 filed Oct. 5, 2017.

BACKGROUND AND FIELD OF THE PRESENT INVENTION

Field of the Present Invention

The present invention relates generally to a system and method for irrigation management and, more particularly, to a system and method for irrigation management using VRI ray casting algorithms within irrigation machine workflows.

Background of the Invention

Modern field irrigation machines are combinations of drive systems and sprinkler systems. Generally, these systems are divided into two types depending on the type of travel they are designed to execute: center pivot and/or linear.

Regardless of being center pivot or linear, common irrigation machines most often include an overhead sprinkler irrigation system consisting of several segments of pipe (usually galvanized steel or aluminum) joined together and supported by trusses, mounted on wheeled towers with sprinklers positioned along its length. These machines move in a circular pattern (if center pivot) or linear pattern and are fed with water from an outside source (i.e. a well or water line).

The essential function of an irrigation machine is to apply an applicant (i.e. water or other solution) to a given location. Ideally, irrigation machines apply specific applicants in exact amounts to precise locations. In reality, there are many factors which complicate the precise delivery of applicants. In response to these many factors, variable rate irrigation systems allow for the continual adjustment of sprinkler applicant rates and other sprinkler settings.

To be optimized, variable rate sprinkler systems require a continual flow of location information. These systems work best when they are able to obtain and dynamically update the exact location of each individual sprinkler as they are transported though a field. Presently, these types of calculations are difficult to obtain for a number of reasons. One reason in particular is that current systems rely extensively on angle base algorithms to determine the location of sprinkler machines. These types of methods are limited in their accuracy and require extensive calculation times. Further, these types of methods have great difficulty in determining whether a particular sprinkler location falls within a given polygon boundary (or target impact area). For instance, U.S. Patent Publication No. 20140074734 to Lassley teaches a water rights marketing system in which the system performs a point-in-polygon test on some or all geo-referenced listing data. Similarly. U.S. Pat. No. 8,739,830 to Bradbury teaches an irrigation system which includes a control arrangement that optimizes an irrigation plan based on the field information and source information and then controls one or more irrigators in accordance with the plan.

In order to overcome the limitations of the prior art, a system is needed which is able to quickly and efficiently calculate the location of irrigation sprinklers during irrigation operations.

SUMMARY OF THE DISCLOSURE

To minimize the limitations found in the prior art, and to minimize other limitations that will be apparent upon reading of the description herein, the present invention provides a system and method for irrigation management using VRI ray casting algorithms within irrigation machine workflows.

According to an exemplary preferred embodiment, the present invention may preferably include a system for use with a self-propelled irrigation system having at least one span and a drive system for moving the span. According to a further preferred embodiment, the system of the present invention may include: a position sensor which determines a position of the irrigation system; a memory system storing a prescribed watering plan for a field; and a variable rate mapping program using VRI ray casting algorithms.

According to a further preferred embodiment, the variable rate mapping program of the present invention may preferably perform the steps of: collecting sprinkler data including sprinkler locations; calculating map locations in reference to the plurality of sprinkler locations; and adjusting sprinkler output settings based on the application of one or more ray casting algorithms.

According to a further preferred embodiment, the system of the present invention may further provide adjustments to the sprinkler output settings including adjustments to the operations of: pumps, and valves, to produce a water pattern matching a prescribed watering plan.

DESCRIPTION OF THE PREFERRED EMBODIMENTS

Figure 1:
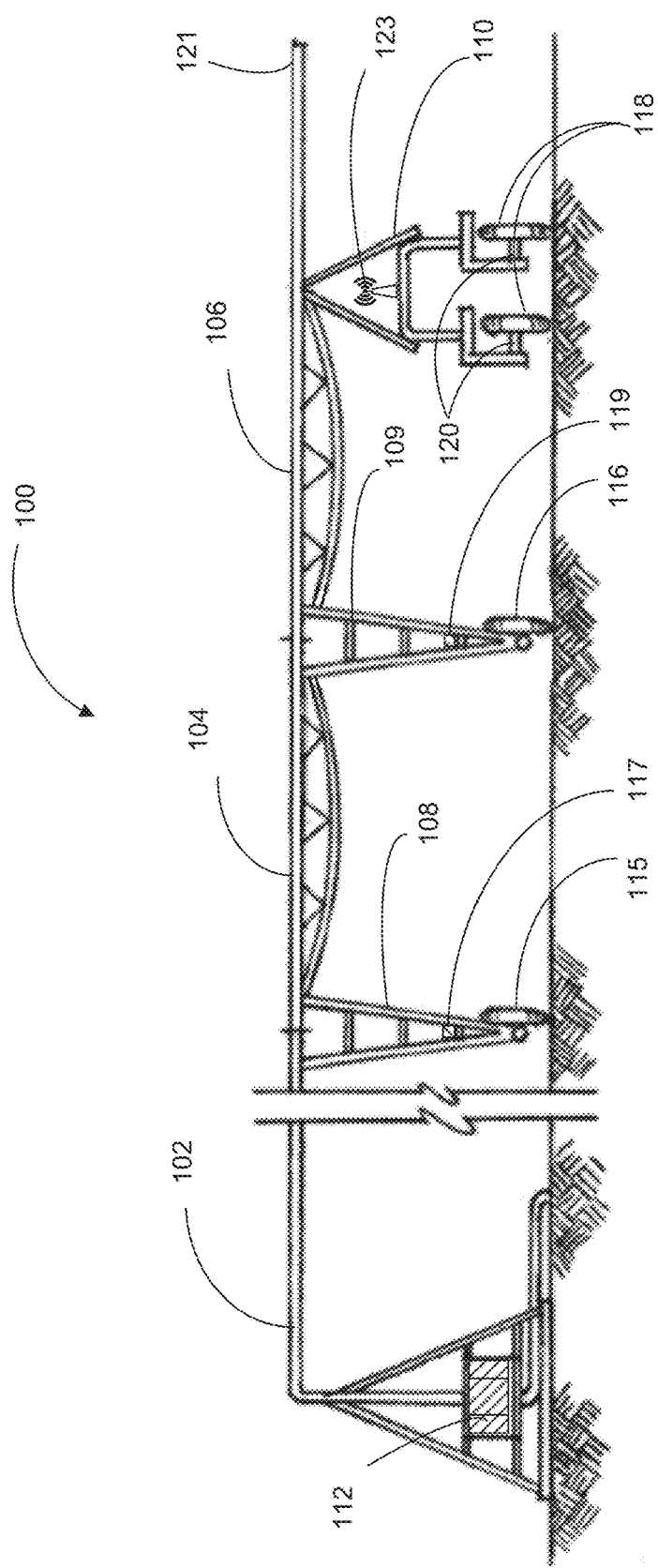
FIG. 1 shows an exemplary irrigation system for use with the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

In accordance with preferred embodiments of the present invention, it should be understood that the term "drive unit" may preferably include a number of sub-components including: a motor, a controller, a communication device (such as a power line carrier-based communication system or the like) and an alignment device. Further, while the invention is discussed below with respect to three exemplary towers, the number of towers used may be expanded or reduced (i.e. 2-100 towers) as needed without departing from the spirit of the present invention. Further, the term "motor" as used herein may refer to any suitable motor for providing torque to a drive wheel. Accordingly, the term "motor" as used herein may preferably include motors such switch reluctance motors, induction motors and the like.

The terms "program," "computer program," "software application," "module," firmware" and the like as used herein, are defined as a sequence of instructions designed for execution on a computer system. The term "solid state" should be understood to refer to a range of solid state electronic devices which preferably include circuits or devices built from solid materials and in which the electrons, or other charge carriers, are confined entirely within the solid material. Exemplary solid-state components/materials may include crystalline, polycrystalline and amorphous solids, electrical conductors and semiconductors. Common solid-state devices may include transistors, microprocessor chips, and RAM.

A program, computer program, module or software application may include a subroutine, a function, a procedure, an object implementation, an executable application, an applet, a servlet, a source code, an object code, a shared library, a dynamic load library and/or other sequence of instructions designed for execution on a computer system. In one embodiment, the computer-executable instructions may include lines of complied C++, Java, HTML, or any other programming or scripting code such as R, Python and/or Excel. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods includes: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neutral network) logic, quantum devices, and hybrids of any of the above device types. Of course, the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structure), bidirectional triode thyristors (TRIAC), mixed analog and digital, and the like.

It should be understood by those skilled in the art that the present invention may preferably include a processor and one or more peripherals may be coupled via a peripheral interface or the like. Example peripheral interfaces may be implemented based on the following standards: Universal Asynchronous Receiver/Transmitter (UART), General Purpose Input Output (GPIO), Serial Peripheral Interface (SPI), Inter-Integrated Circuit (I2C), but not limited to the above standards. In some examples, the peripheral interfaces may only include the bus; while in other examples, the peripheral interfaces may also include other components, one or more controllers, for example, which may be a display controller for connecting a liquid crystal display panel or a storage controller for connecting storage. In addition, these controllers may also be separated from the peripheral interface and integrated inside the processor or the corresponding peripheral.

Additionally, the functions of the disclosed embodiments may be implemented on one computer or shared/distributed among two or more computers in or across a network or a cloud. Communications between computers implementing embodiments may be accomplished using any electronic, optical, radio frequency signals, or other suitable methods and tools of communication in compliance with known network protocols. For example, the present invention may include an RF module for receiving and transmitting electromagnetic waves, implementing the conversion between electromagnetic waves and electronic signals, and communicating with the communication network or other devices. The RF module may include a variety of existing circuit elements, which perform functions, such as antennas, RF transceivers, digital signal processors, encryption/decryption chips, the subscriber identity module (SIM) card, memory, etc. The RF module can communicate with a variety of networks such as the Internet, intranets, wireless network and communicate to other devices via wireless network.

The above wireless networks may include a cellular telephone network, wireless local area network (LAN) or metropolitan area network (MAN). The above wireless networks can use a variety of communications standards, protocols and technologies, including but not limited to Global System for Mobile Communication (GSM), Enhanced Data GSM Environment (EDGE), wideband code division multiple access (W-CDMA), Code division access (CDMA), time division multiple access (TDMA), Wireless, Fidelity (Wi-Fi) (such as the American Institute of Electrical and Electronics Engineers Association standards IEEE 802.11a, IEEE 802.11b, IEEE802.11g, and/or IEEE 802.11n), Voice over internet protocol (VoIP), Worldwide Interoperability for Microwave Access (Wi-Max), other protocols used for mail, instant messaging and short message, as well as any other suitable communication protocol, even including the protocols which are not yet been developed currently.

FIGS. 1-5 illustrate various configurations of irrigation systems which may be used with example implementations of the present invention. As should be understood, the irrigation systems shown in FIGS. 1-5 are exemplary systems onto which the features of the present invention may be integrated. Accordingly, FIGS. 1-5 are intended to be purely illustrative and any of a variety of systems (i.e. fixed systems as well as linear and center pivot self-propelled irrigation systems; stationary systems; corner systems) may be used with the present invention without limitation. For example, although FIG. 1 is shown as a center pivot irrigation system, the exemplary irrigation system 100 of the present invention may also be implemented as a linear irrigation system. The example irrigation system 100 is not intended to limit or define the scope of the present invention in any way. According to further preferred embodiments, the present invention may be used with a variety of motor types such as gas powered, DC powered, switch reluctance, single phase AC and the like.

Additionally, any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

With reference now to FIG. 1, spans 102, 104, 106 are shown supported by drive towers 108, 109, 110. Further, each drive tower 108, 109, 110 is shown with respective motors 117, 119, 120 which provide torque to the drive wheels 115, 116, 118. As further shown in FIG. 1, the irrigation machine 100 may preferably further include an extension/overhang 121 which may include an end gun (not shown). As further shown, a position sensor 123 may be provided to provide positional and angular orientation data for the system of the present invention as discussed further below. As further shown, a control panel 112 is shown for enclosing elements of an exemplary control device 150 as discussed further below. It should be further understood that FIG. 1 provides an illustration of an irrigation machine 100 without many added powered elements and sensors. However, any of a variety of different sensing systems may be added without limitation.

Figure 2:
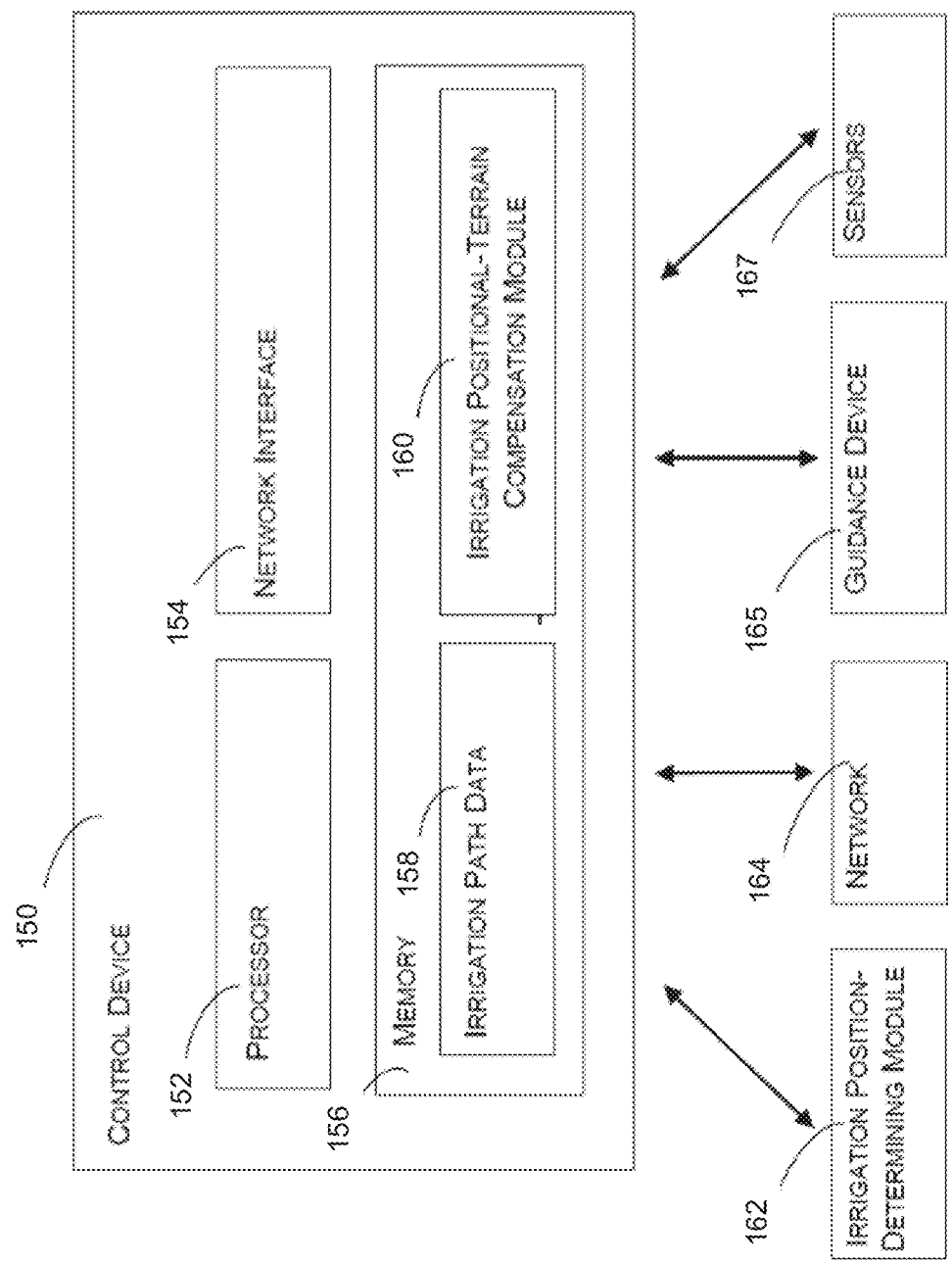
FIG. 2 shows a block diagram illustrating the exemplary processing architecture of a control device in according with a first preferred embodiment of the present invention.

With reference now to FIG. 2, an exemplary control device 150 which represents functionality to control one or more operational aspects of the irrigation system 100 will now be discussed. As shown, the exemplary control device 150 may include a processor 152, a memory 156 and a network interface 154. The processor 152 may provide processing functionality for the control device 150 and may include any number of processors, micro-controllers, or other processing systems. The processor 152 may execute and the memory may store one or more software programs, as well as other data, to allow the processor 152 and other elements of the control device 150 to implement techniques described herein. The memory 156 may further provide storage for sets of instructions or modules such as, for example, an irrigation path data module 158, a positional-terrain compensation module 160 and the like. The network interface 154 preferably provides functionality to enable the control device 150 to communicate with one or more networks 164 through a variety of components such as wireless access points, transceivers and so forth, and any associated software employed by these components (e.g., drivers, configuration software, and so on).

In implementations, the irrigation position-determining module 162 may include a global positioning system (GPS) receiver or the like to calculate a location of the irrigation system 100. Additionally, the irrigation position-determining module 162 may preferably further include ray casting algorithms for determining individual sprayer locations as discussed with respect to FIGS. 3-5 below.

Preferably, the control device 150 may be coupled to a guidance device 165 or similar system of the irrigation system 100 (e.g., steering assembly or steering mechanism) to control movement of the irrigation system 100. As further shown, the control device 150 may further include a positional-terrain compensation module 160 to assist in controlling the movement and locational awareness of the system. Further, the control device 150 may preferably further include multiple inputs and outputs to receive data from sensors 167 and monitoring devices as discussed further below.

Figure 3:
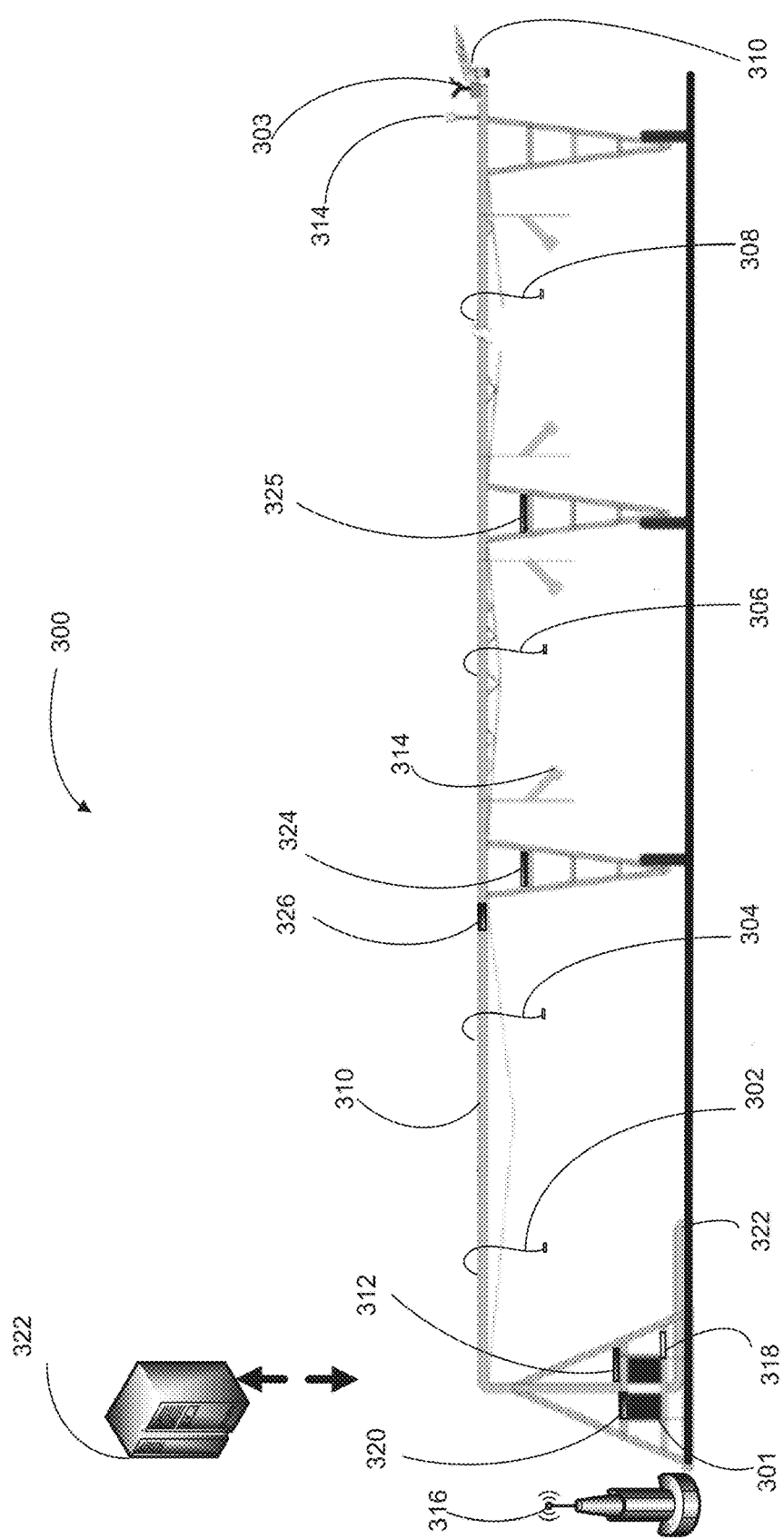
FIG. 3 shows an exemplary irrigation system in accordance with further preferred embodiment of the present invention.

With reference now to FIG. 3, a further detailed embodiment of the present invention shall now be discussed. As with the exemplary example of FIG. 1, the exemplary irrigation system 300 shown in FIG. 3 is a center-pivot irrigation system. However, as stated above, the present invention may be used and implement in any irrigation system regardless of whether it is linear or center pivot. As shown in FIG. 3, the present invention may preferably be implemented by attaching elements of the present invention to one or more spans 310 of an irrigation system which is connected to a well or water source 322. As further shown, the exemplary irrigation system 300 may preferably further include transducers 320, 326 which are provided to control and regulate water pressure, as well as drive units 324, 325 which may preferably be programmed to monitor and control portions of the irrigation unit drive system. Further, the system of the present invention may preferably further include elements such as a GPS receiver 303 for receiving positional data and a flow meter 318 for monitoring water flow in the system. Still further, the system may further include indirect crop sensors 314 which preferably may include moisture sensors to determine the moisture levels in an area of soil. Still further, the detection system may further include a weather station 316 or the like which may measure weather features such as humidity, pressure, precipitation, temperature and the like. Still further, the system may preferably further include a wireless transceiver/router 312 and/or external servers 322 for receiving and transmitting signals between system elements.

According to a further preferred embodiment, the system of the present invention may further include sprayers 302, 304, 306, 308, 310 which may preferably be monitored and controlled via client-side software residing in the main control panel 301 or at another site. According to a further preferred embodiment, each sprayer may preferably be controlled individually or in groups by the main controller 301. According to a further preferred embodiment, the main controller 301 may control one or more aspects of each sprayer 302, 304, 306, 308, 310 including: the sprayer angle, nozzle opening; water pressure; nozzle on/off and the like.

According to a further preferred embodiment, the spray characteristics and physical locations of each sprayer 302, 304, 306, 308, 310 are preferably stored in the main controller 301. According to a further preferred embodiment, the location of each sprayer 302, 304, 306, 308, 310 may preferably be calculated relative to a single location determined by a single GPS receiver 303. Alternatively, each sprayer location may be individually determined via individual GPS receivers or the like.

Figure 4:
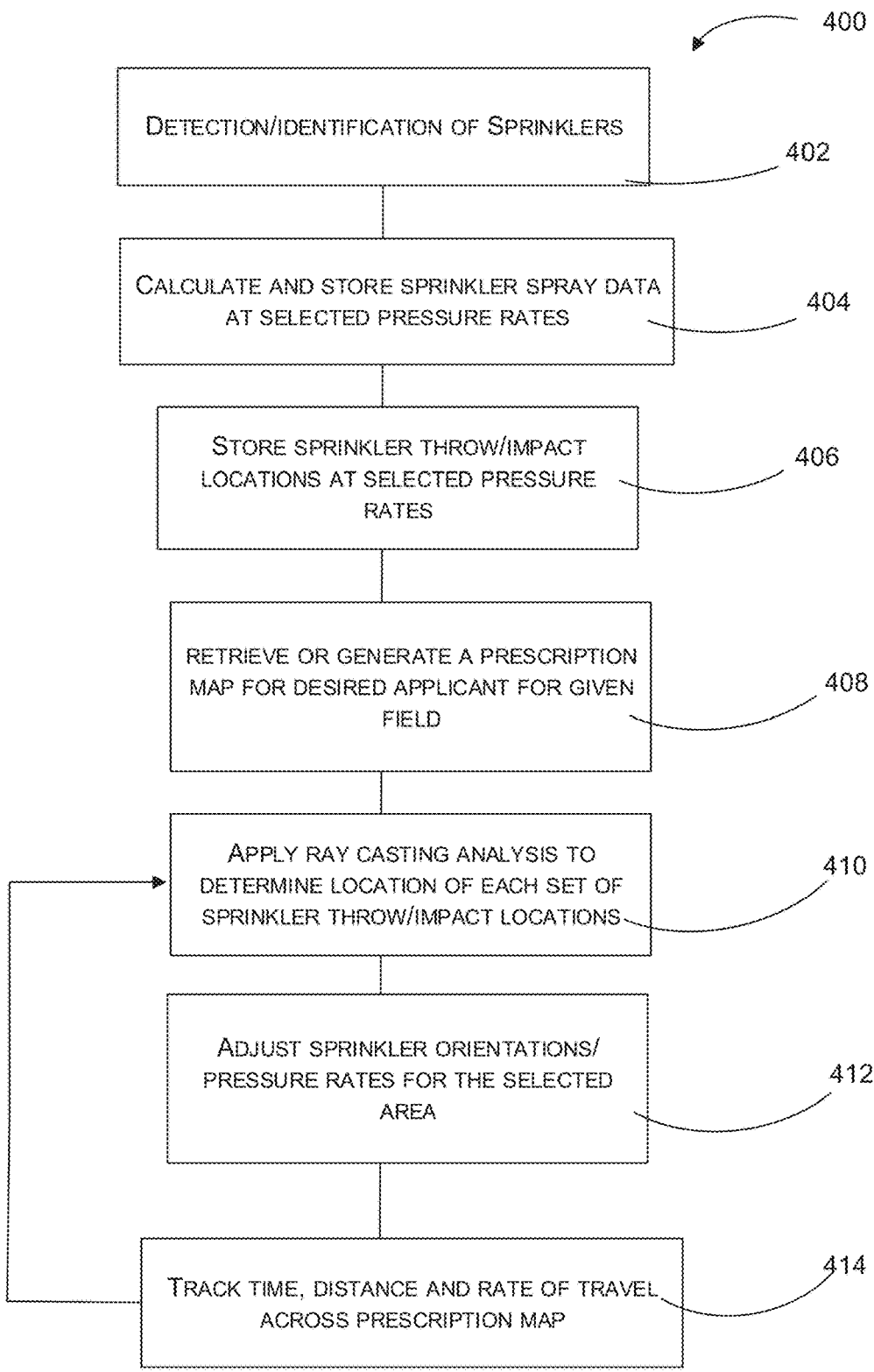
FIG. 4 shows a block diagram illustrating a preferred method in accordance with a preferred embodiment of the present invention.

With reference now to FIG. 4, according to a preferred embodiment of the present invention, the irrigation position-determining module 162 may reside and run within the main control panel 301 and/or control device 150 as discussed above to execute methods for use with the present invention. As shown in FIG. 4, an exemplary method 400 executed by the irrigation position-determining module 162 and control device 150 of the present invention may include a first step 402 of detecting and identifying a set of sprinklers. According to alternative preferred embodiments, the identification of sprinklers in step 402 may be achieved by linking to a pre-populated table listing a predetermined set of sprinklers and their respective locations. Alternatively, the system may poll available sprinklers for identification and location information. Where the sprinklers are located together on a single irrigation machine, their relative locations may also be retrieved and stored. According to a preferred embodiment, the system of the present invention may preferably receive the location data for each identified sprinkler directly from the sprinklers themselves or may calculate the relative locations of sprinklers from: 1) the geometry of the irrigation machine (e.g. radial location of the sprinkler relative to the pivot point); 2) movement of the machine (e.g. a circular path about the pivot point divided into 0.1-degree increments) or by alternative methods.

At a next step 404, the system of the present invention may further retrieve and/or calculate sprinkler spray data at selected pressure rates. In this step, the calculated spray data may include: the spray rate, spray range, spray direction, spray angle, impact area and the like for each sprinkler, for each of a variety of selected pressure ranges. Accordingly, the system preferably calculates respective sprinkler application rates for an applied applicant for each sprinkler. Preferably, these calculations may be performed over a range of water pressures and variable speed pump settings (collectively referred to as "water pressure rates").

With reference again to FIG. 4, at a next step 406, the system of the present invention preferably may preferably store the sprinkler application rates at selected water pressure rates for each sprinkler. For example, a look-up table may be created and stored which may preferably include sprinkler location data and sprinkler application rate data for each sprinkler at a range of pressure settings.

With reference again to FIG. 4, at a next step 408 the system of the present invention may preferably retrieve or generate a prescription map for a given field to be irrigated. According to a preferred embodiment, the prescription map may preferably divide a given field into one or more management zones each having its own preferred application rate for a given applicant on a given date. Such management zones may be generated based on a variety of field data such as: soil samples; geolocation recommendations, crop advisor mapping, satellite data, and the like.

At a next step 410, the system of the present invention may preferably then apply ray casting analysis to determine the location of each sprinkler relative to the determined prescription map. According to a preferred embodiment, the system of the present invention preferably uses ray casting to determine which management zone each sprinkler is located in.

A key feature of the present invention is the use of ray casting techniques using rays to determine the intersection of points. As discussed above, the present invention applies these ray casting techniques to determine sprinkler locations and to execute an irrigation plan in accordance with a prescription map. With this method, a preferred system of the present invention preferably locates each irrigation element/point within a given map. Accordingly, instead of taking an area and finding the points in it (i.e. angle based analysis), a system in accordance with the present invention preferably takes known points and locations and identifies a given area that they fall into. Using this novel solution, a system incorporating the present invention may input thousands of sprinkler locations, and then calculate each sprinkler's location at fractions of degrees for 360 degrees and determine appropriate application rates from a designed map of the field.

Preferably, the system of the present invention applies ray casting by looking in incremented ray casting directions until it runs into a boundary. Based on the boundary locations identified, the system can determine which management zone(s) the sprinkler is located in and which irrigation rates should be applied. Once this determination is made, in a next step 412 the system of the present invention preferably adjusts sprinkler nozzle settings and/or pressure rates for each sprinkler to match the application rates for the appropriate management zones where each sprinkler is located. According to a preferred embodiment, when a sprinkler is located on a border between two or more zones, the system may preferably determine an appropriate application rate based on: 1) a priority setting for each management zone so that one zone has priority over another; 2) an average application rate of the adjoining management zones; or 3) a set application rate for each management zone border.

Thereafter, the system of the present invention at a next step 414 may then preferably track the time, distance and rate of travel across a given prescription map while executing a given watering plan. According to a preferred embodiment, as the irrigation plan is executed, the system of the present invention may preferably continually update and perform step 410 to apply ray casting analysis to determine and update which management zone each sprinkler is located in. Thereafter, the system of the present invention may then repeatedly execute step 412 and continually adjust sprinkler nozzle settings and/or pressure rates for each sprinkler to match the application rates for the appropriate management zones for each sprinkler location as the sprinklers are moved around a given field. Where a sprinkler remains stationary, the system may still update application rates based on any updates or changes to the prescription map.

Figure 5:
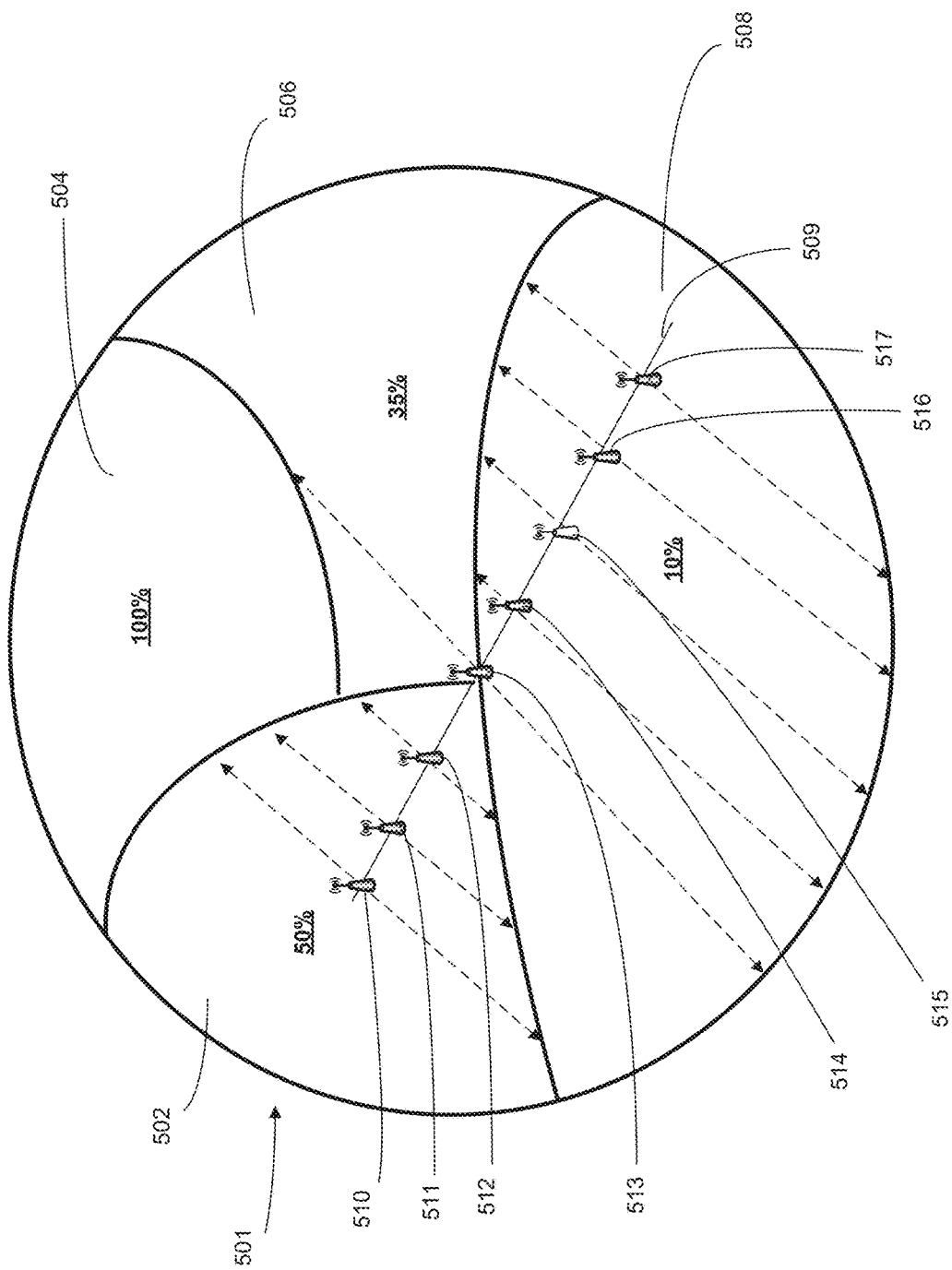
FIG. 5 shows an exemplary diagram illustrating a prescription map and sprinkler locations in accordance with a preferred embodiment of the present invention.

With reference now to FIG. 5, the execution of the method shown in FIG. 4 shall now be further discussed. As shown in FIG. 5, a prescription map 501 may include for example: a management zone 502 requiring an application rate of 50%; a management zone 504 requiring an application rate of 100%; a management zone 506 requiring an application rate of 35%; and a management zone 508 requiring an application rate of 10%. Further, an example irrigation system may include several sprinklers 510-517 which may be arranged in a line 509 on an irrigation machine (not shown) which is movable across the field.

In accordance with the present invention, for each sprinkler location 510-517, the system of the present may preferably use ray casting to identify which management zone each sprinkler is located within. Accordingly, for sprinkler 510 ray casting analysis is preferably performed to identify that the sprinkler 510 is within a first management zone 502. In practice, the applied ray casting technique locates each sprinkler within a management zone by finding the edges of the boundaries of the management zones. Based on this analysis, the system of the present invention (in step 412 discussed above) preferably adjusts the sprinkler nozzle settings and/or pressure rates for sprinkler 510 to match the 50% application rate for the first management zone 502.

As discussed above, where a sprinkler 513 is found to be located on a border between two or more zones, the system may preferably determine an appropriate application rate based on: 1) a priority setting for each management zone so that one zone has priority over another; 2) an average of the adjoining management zones; or 3) a set application rate for each management zone border. Accordingly, for example, the system may determine that the appropriate application rate for sprinkler 513 would be 32% based on an average of the application rates of the three adjoining management zones (50%, 35%, 10%).

According to a preferred embodiment, a module or program incorporating the present invention may preferably coordinate the execution of steps 410, 412 and 414 as an irrigation machine moves through a given field. According to further preferred embodiments, the control program of the present invention will preferably translate these field specific sprinkler data points into a format compatible with the irrigation machine. The controller may then preferably use the sprinkler data, machine location(s) and sprinkler location (s) to follow the predesigned settings to improve effective water distribution, increase irrigated acres and reduce water loss.

While the above descriptions regarding the present invention contain much specificity, these should not be construed as limitations on the scope, but rather as examples. For instance, it should be understood that the system may be formed from any suitable software, hardware, or both, configured to implement the features of the present invention.

Further, it should be understood that many other variations are possible. For example, the processing elements of the present invention by the present invention may operate on a number of frequencies. Further, the communications provided with the present invention may be designed to be duplex or simplex in nature. Further, as needs require, the processes for transmitting data to and from the present invention may be designed to be push or pull in nature. Still, further, each feature of the present invention may be made to be remotely activated and accessed from distant monitoring stations. Accordingly, data may preferably be uploaded to and downloaded from the present invention as needed.

Accordingly, the scope of the present invention should be determined not by the embodiments illustrated, but by the appended claims and their legal equivalents.

What is claimed is:

1. A method for use with a self-propelled irrigation system having at least one span and a drive system for moving the span, the system including a position sensor, a memory system, and a variable rate mapping program configured to collect sprinkler data and adjust application rates, the method comprising the steps of:

detecting and identifying a plurality of sprinklers;
  storing sprinkler spray data for the plurality of sprinklers; wherein the sprinkler spray data comprises a look-up table of sprinkler application rates at selected water pressure rates and selected duty rates;
  executing an irrigation prescription plan; wherein the irrigation prescription plan comprises data regarding an irrigation route and rate of travel for the irrigation system; further wherein the prescription plan further comprises an irrigation map comprising a location of one or more field segments; wherein the irrigation map further comprises data regarding a prescribed amount of applicant to be applied to at least a first field segment, a second field segment and third field segment of the field to be irrigated;
  calculating an initial location of a first sprinkler, a second sprinkler and a third sprinkler;
  determining a water pressure for the irrigation system;
  determining an initial sprinkler application rate for each of the first sprinkler, second sprinkler and third sprinkler based on a determined water pressure and a first rate of travel;
  determining a first field segment location of a first sprinkler, wherein the first field segment location comprises the field segment where the first sprinkler is located; wherein the first field segment location is determined by finding a set of boundary edges of the first field segment surrounding the first sprinkler; wherein the first field segment location is determined by ray casting from the location of the first sprinkler until a boundary edge is detected;
  adjusting a duty cycle of the first sprinkler to change a sprinkler application rate of the first sprinkler to match a prescribed sprinkler application rate for the determined first field segment location at the first rate of travel;
  adjusting a sprinkler nozzle setting within the irrigation system to further adjust the sprinkler application rate of a sprinkler;
  calculating a first updated position of the first sprinkler; determining a first updated field segment location of the first sprinkler; wherein the first updated field segment location is determined by ray casting from the first updated position of the first sprinkler until a segment boundary is detected;
  adjusting the duty cycle of the first sprinkler to change the sprinkler application rate of the first sprinkler to match a prescribed sprinkler application rate at the first rate of travel for the determined first updated field segment location;
  determining a second field segment location of the second sprinkler, wherein the second field segment location comprises the field segment where the second sprinkler is located within; wherein the second field segment location is determined by ray casting from the location of the second sprinkler until a segment boundary is detected;
  adjusting a duty cycle of the second sprinkler to change a sprinkler application rate of the second sprinkler to match a prescribed sprinkler application rate at the first rate of travel for the determined second field segment location;
  calculating a second updated position of the second sprinkler; determining a second updated field segment location of the second sprinkler; wherein the second updated field segment location is determined by ray casting from the second updated position of the second sprinkler until a segment boundary is detected;
  adjusting the duty cycle of the second sprinkler to change the sprinkler application rate of the second sprinkler to match the prescribed sprinkler application rate at the first rate of travel for the determined second updated field segment location; wherein the first field segment location is different from the second field segment location; further wherein the sprinkler application rate of the first sprinkler is different from the sprinkler application rate of the second sprinkler;
  detecting when the first sprinkler is located within a defined border area adjacent to the first, second and third field segment locations; and
  adjusting the duty cycle of the first sprinkler to a duty cycle which provides an adjusted sprinkler application rate; wherein the adjusted sprinkler application rate is calculated as an average of the sprinkler application rates for the first, second and third field segment locations;

wherein the location of the first sprinkler, the second sprinkler and the third sprinkler are determined from an initial calculation of at least one portion of the irrigation system;

wherein the sprinklers are identified by linking to a pre-populated table listing a predetermined set of sprinklers and respective locations for each sprinkler;

wherein the sprinklers are identified by polling available sprinklers for identification and location information;

wherein the sprinkler spray data comprises a spray rate, a spray range, a spray direction, a spray angle, and an impact area for a given sprinkler; wherein the spray data is calculated for a range of water pressures;

wherein the look-up table is comprised of sprinkler location data and sprinkler application rate data for each sprinkler at a range of pressure settings.

2. The method of claim 1, wherein the field segments are determined based on soil types within each field segment.

3. The method of claim 2, wherein the method further comprises the step of adjusting the rate of travel for the irrigation system to adjust the sprinkler application rate of a sprinkler.

4. The method of claim 2, wherein the method further comprises the step of adjusting the water pressure within the irrigation system to adjust the sprinkler application rate of a sprinkler.

5. The method of claim 3, wherein the method further comprises the step of updating a sprinkler application rate based on updates to the prescription map.

6. The method of claim 4, wherein the method further comprises the step of tracking a time, a distance and a rate of travel of the irrigation system while executing a given watering plan.

* * * * *